United States Patent
Wollenweber

(10) Patent No.: US 7,418,813 B2
(45) Date of Patent: Sep. 2, 2008

(54) GAS TURBINE ENGINE EXHAUST NOZZLE INCLUDING AN INFRARED SUPPRESSION SYSTEM HAVING A PLURALITY OF U-SHAPED BLOCKING FINS AND METHOD OF ASSEMBLING SAID EXHAUT NOZZLE

(75) Inventor: Gary C. Wollenweber, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 539 days.

(21) Appl. No.: 11/022,995

(22) Filed: Dec. 27, 2004

(65) Prior Publication Data

US 2006/0137323 A1 Jun. 29, 2006

(51) Int. Cl.
- F02C 7/08 (2006.01)
- F02G 1/00 (2006.01)
- F02G 3/00 (2006.01)

(52) U.S. Cl. ............................ 60/39.5; 60/770; 181/213
(58) Field of Classification Search ................... 60/770, 60/262, 39.5, 226.1; 181/213
See application file for complete search history.

(56) References Cited

U.S. PATENT DOCUMENTS

| 3,027,710 | A | * | 4/1962 | Maytner | 239/127.3 |
| 4,077,206 | A | * | 3/1978 | Ayyagari | 60/262 |
| 4,117,671 | A | * | 10/1978 | Neal et al. | 60/262 |
| 4,240,252 | A | * | 12/1980 | Sargisson et al. | 60/262 |
| 4,335,801 | A | * | 6/1982 | Stachowiak et al. | 181/213 |
| 4,592,201 | A | * | 6/1986 | Dusa et al. | 60/262 |
| 4,696,159 | A | * | 9/1987 | Horgan | 60/226.1 |
| 4,813,230 | A | * | 3/1989 | Braithwaite | 60/262 |
| 4,819,425 | A | * | 4/1989 | Farquhar et al. | 60/226.1 |
| 5,440,875 | A | * | 8/1995 | Torkelson et al. | 60/226.1 |
| 5,761,900 | A | * | 6/1998 | Presz, Jr. | 60/262 |
| 5,775,095 | A | * | 7/1998 | Zysman et al. | 60/204 |
| 5,794,432 | A | * | 8/1998 | Dunbar et al. | 60/204 |
| 5,884,472 | A | * | 3/1999 | Presz et al. | 60/262 |
| 5,943,856 | A | * | 8/1999 | Lillibridge et al. | 60/262 |
| 6,016,651 | A | * | 1/2000 | Hammond et al. | 60/39.5 |
| 6,276,127 | B1 | * | 8/2001 | Alberti | 60/262 |
| 6,502,383 | B1 | * | 1/2003 | Janardan et al. | 60/226.1 |
| 6,606,854 | B1 | * | 8/2003 | Siefker et al. | 60/262 |
| 6,804,948 | B2 | * | 10/2004 | Oishi | 60/262 |
| 6,813,877 | B2 | * | 11/2004 | Birch et al. | 60/226.1 |
| 6,854,260 | B2 | * | 2/2005 | Anderson | 60/204 |
| 6,935,098 | B2 | * | 8/2005 | Bardagi et al. | 60/262 |
| 7,017,331 | B2 | * | 3/2006 | Anderson | 60/204 |
| 7,017,332 | B2 | * | 3/2006 | Oishi | 60/262 |
| 7,114,323 | B2 | * | 10/2006 | Schlinker et al. | 60/204 |

(Continued)

*Primary Examiner*—William H Rodriguez
(74) *Attorney, Agent, or Firm*—William Scott Andes, Esq.; Armstrong Teasdale LLP

(57) ABSTRACT

A method for assembling a gas turbine engine includes mounting a core engine to a vehicle, coupling a fuselage radially outward and around the core engine, coupling an exhaust nozzle to the core engine to channel exhaust gases discharged from the core engine, wherein the exhaust nozzle includes a cowl and a primary nozzle coupled radially inward from the cowl, and coupling an infrared suppression system in flow communication with the engine exhaust nozzle to facilitate suppressing an exhaust infrared signature of the core engine, wherein the infrared suppression system includes a blocking fin having a substantially U-shaped cross-sectional profile and such that a cooling air flowpath is defined between the cowl and the blocking fin.

21 Claims, 5 Drawing Sheets

U.S. PATENT DOCUMENTS 7,240,493 B2 * 7/2007 Seiner .................. 60/770
2003/0182925 A1 * 10/2003 Lair .................. 60/226.1
2004/0159092 A1 * 8/2004 Anderson .................. 60/262

* cited by examiner

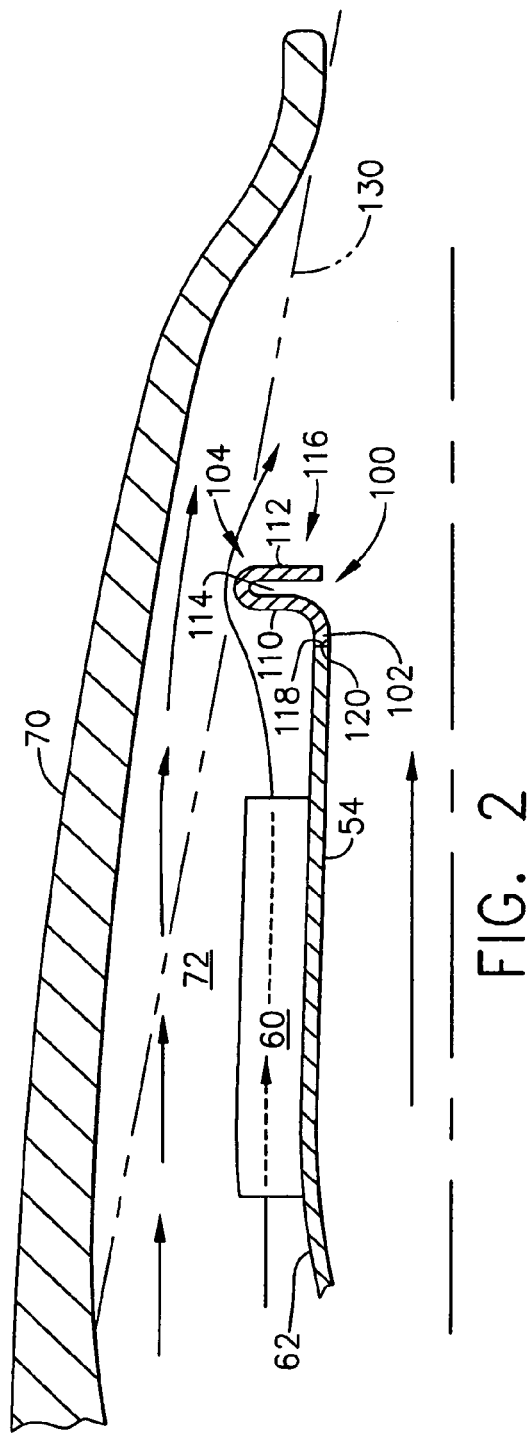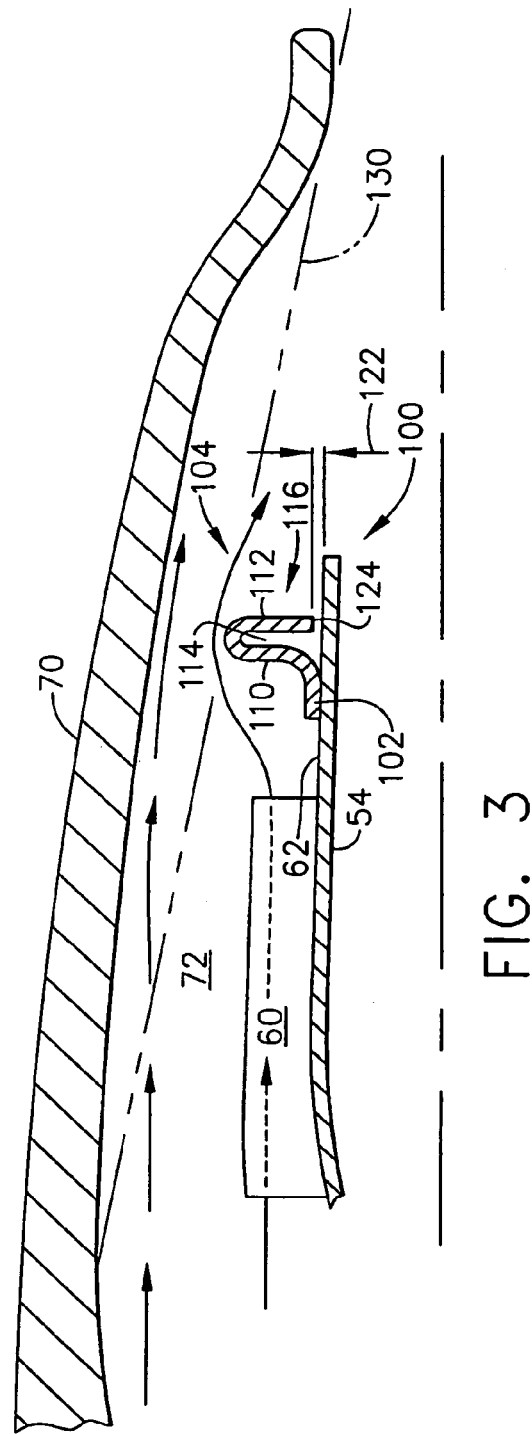

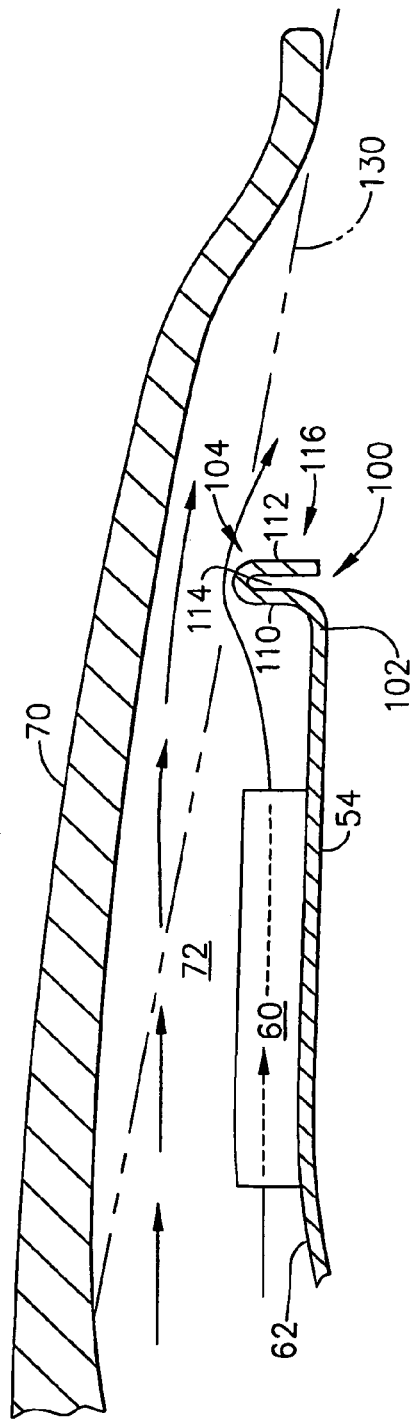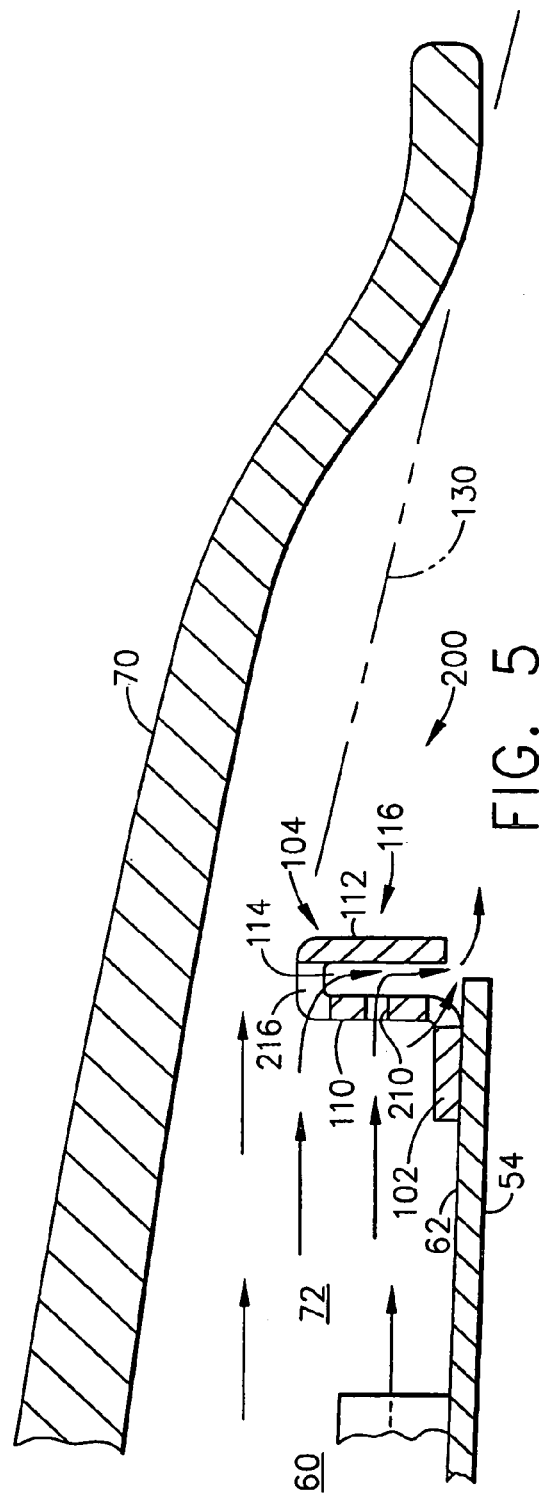

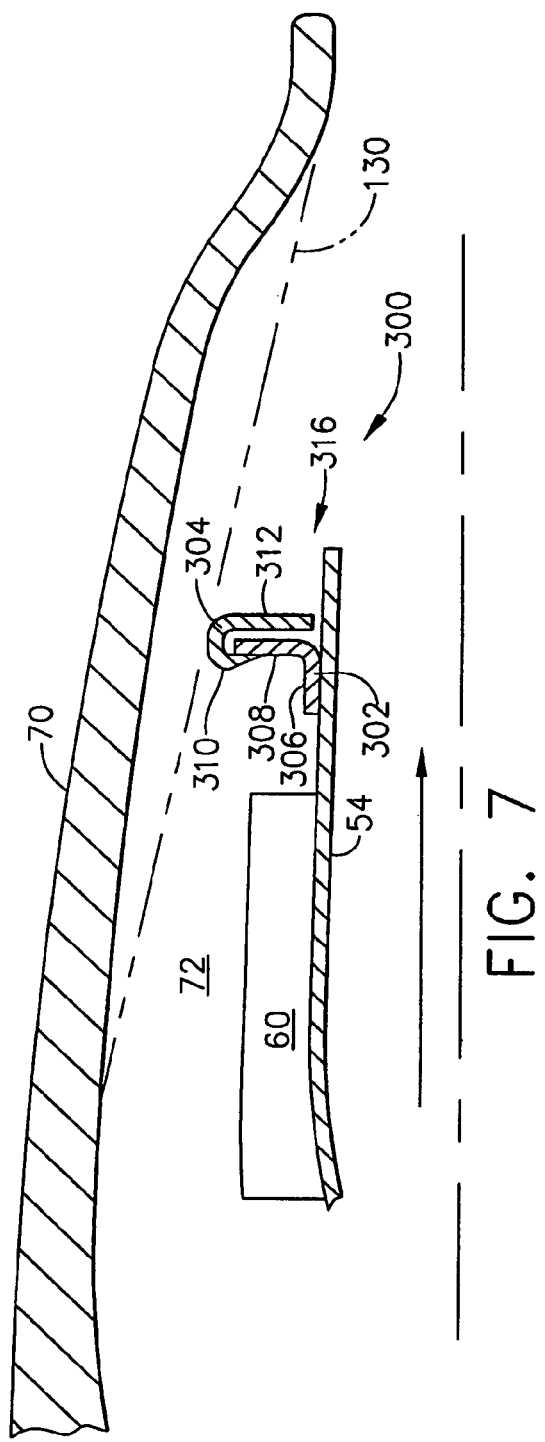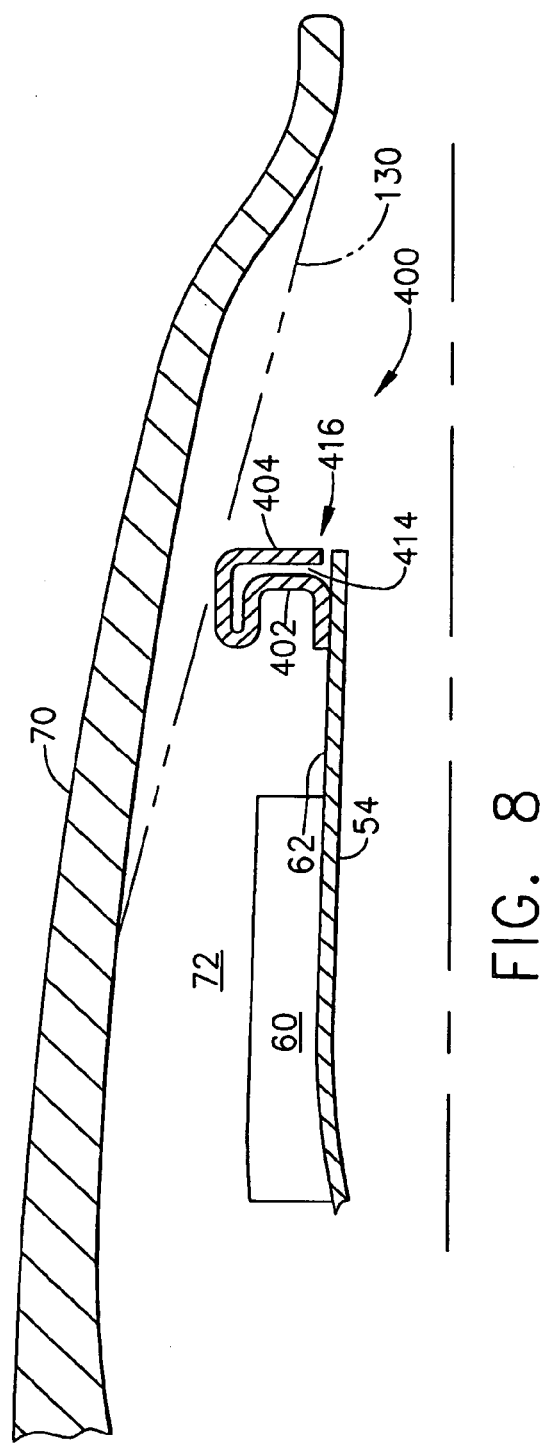

GAS TURBINE ENGINE EXHAUST NOZZLE INCLUDING AN INFRARED SUPPRESSION SYSTEM HAVING A PLURALITY OF U-SHAPED BLOCKING FINS AND METHOD OF ASSEMBLING SAID EXHAUT NOZZLE

BACKGROUND OF THE INVENTION

This invention relates generally to infrared suppression devices and more generally to methods and apparatus for reducing infrared emission from gas turbines such as those used, for example, in helicopters.

In some helicopters used in hostile environments, gear boxes used to drive helicopter rotors are driven by gas turbine engines. Known gas turbine engines rotate at typically higher revolutions per minute (RPM) than the helicopter rotors. Known engines also include a tailpipe which channels exhaust overboard from the gas turbine engines. As a result of hot exhaust gases flowing therethrough, the operating temperature of a known tailpipe increases during engine operation, and thus, an infrared signal generated by the tailpipe also increases.

With recent advancements in weapons detection technology, there is growing recognition of the importance of reducing the infrared signature associated with gas turbine engines powering military aircraft and land combat vehicles. Moreover, infrared signature reductions facilitate reducing the possibility of detection and pursuit by enemy anti-aircraft forces including heat-seeking missiles. As a result, at least some known aircraft use a combination of infrared defensive systems. For example such systems may include a propulsion system infrared suppression, a suppression system to facilitate suppressing other infrared sources on the aircraft, infrared countermeasures, i.e., a jamming device, and/or improved aircraft paint. These defensive systems contribute individually and as a system to synergistically facilitate reducing the susceptibility of the vehicle to a missile attack, and as a result, such systems facilitate reducing aircraft vulnerability, while increasing aircraft, crew, passenger and payload survivability.

Generally, the largest source of infrared energy is emitted from the aircraft engine exhaust. More specifically, exposed metal surfaces within the exhaust pipe emit infrared electromagnetic radiation at all wavelengths after being exposed to the high temperature exhaust gases. Specifically, at least some known metal surfaces exposed to hot gases can emit large amounts of infrared radiation between approximately 1.5 and approximately 5.0 microns. Moreover, hot exhaust gases from the engine exhaust can include $CO_2$, $NO_2$, and/or $H_2O$ molecules that can emit infrared energy at wavelengths of approximately 1.4, 1.8-2.0, 2.6-2.8 and 4.24.3 microns, respectively, thus contributing to the infrared signature.

To facilitate reducing an aircrafts's susceptibility to an infrared missile attack, at least some known engines channel ambient air past at least some of the exposed visible surfaces to facilitate diluting exhaust gases discharged from the engine. However, at least one known infrared suppression system actually absorbs heat that is emitted from the gas turbine exhaust thus increasing a temperature of the infrared suppression system itself.

BRIEF DESCRIPTION OF THE INVENTION

In one aspect, a method for assembling a gas turbine engine is provided. The method includes mounting a core engine to a vehicle, coupling a fuselage radially outward and around the core engine, coupling an exhaust nozzle to the core engine to channel exhaust gases discharged from the core engine, wherein the exhaust nozzle includes a duct and an primary nozzle coupled radially inward from the duct, and coupling an infrared suppression system in flow communication with the engine exhaust nozzle to facilitate suppressing an exhaust infrared signature of the core engine, wherein the infrared suppression system includes a blocking fin having a substantially U-shaped cross-sectional profile and such that a cooling air flowpath is defined between the duct and the blocking fin.

In another aspect, an exhaust assembly for a gas turbine engine is provided. The exhaust assembly includes an engine exhaust nozzle coupled to the gas turbine engine, an exhaust duct at least partially circumscribing the engine exhaust nozzle such that a cooling passage is defined between the engine exhaust nozzle and the exhaust duct, and an infrared suppression system coupled to the engine exhaust nozzle, the infrared suppression system comprising a substantially U-shaped cross-sectional profile that extends at least partially into the cooling passage, the suppression system facilitates suppressing an exhaust infrared signature of the gas turbine engine.

In a further aspect, a gas turbine engine is provided. The gas turbine engine includes an engine exhaust nozzle coupled to the gas turbine engine, an exhaust duct at least partially circumscribing the engine exhaust nozzle such that a cooling passage is defined between the engine exhaust nozzle and the exhaust duct, an infrared suppression system coupled to the engine exhaust nozzle, the infrared suppression system comprising a substantially U-shaped cross-sectional profile that extends at least partially into the cooling passage, the suppression system facilitates suppressing an exhaust infrared signature of the gas turbine engine, and a plurality of cooling fins coupled to the engine exhaust nozzle axially forward of the infrared suppression system.

BRIEF DESCRIPTION OF THE DRAWINGS

FIG. 2 is a cross-sectional view of an exemplary infrared suppression system in a first operational configuration that may be used with the vehicle shown in FIG. 1;

FIG. 3 is a cross-sectional view of an exemplary infrared suppression system in a second operational configuration that may be used with the vehicle shown in FIG. 1;

FIG. 4 is a cross-sectional view of an exemplary infrared suppression system in a third operational configuration that may be used with the vehicle shown in FIG. 1;

FIG. 5 is a cross-sectional view of an exemplary infrared suppression system that may be used with the vehicle shown in FIG. 1;

FIG. 7 is a cross-sectional view of an exemplary infrared suppression system that may be used with the vehicle shown in FIG. 1; and FIG. 8 is a cross-sectional view of an exemplary infrared suppression system that may be used with the vehicle shown in FIG. 1.

DETAILED DESCRIPTION OF THE INVENTION

Figure 1:
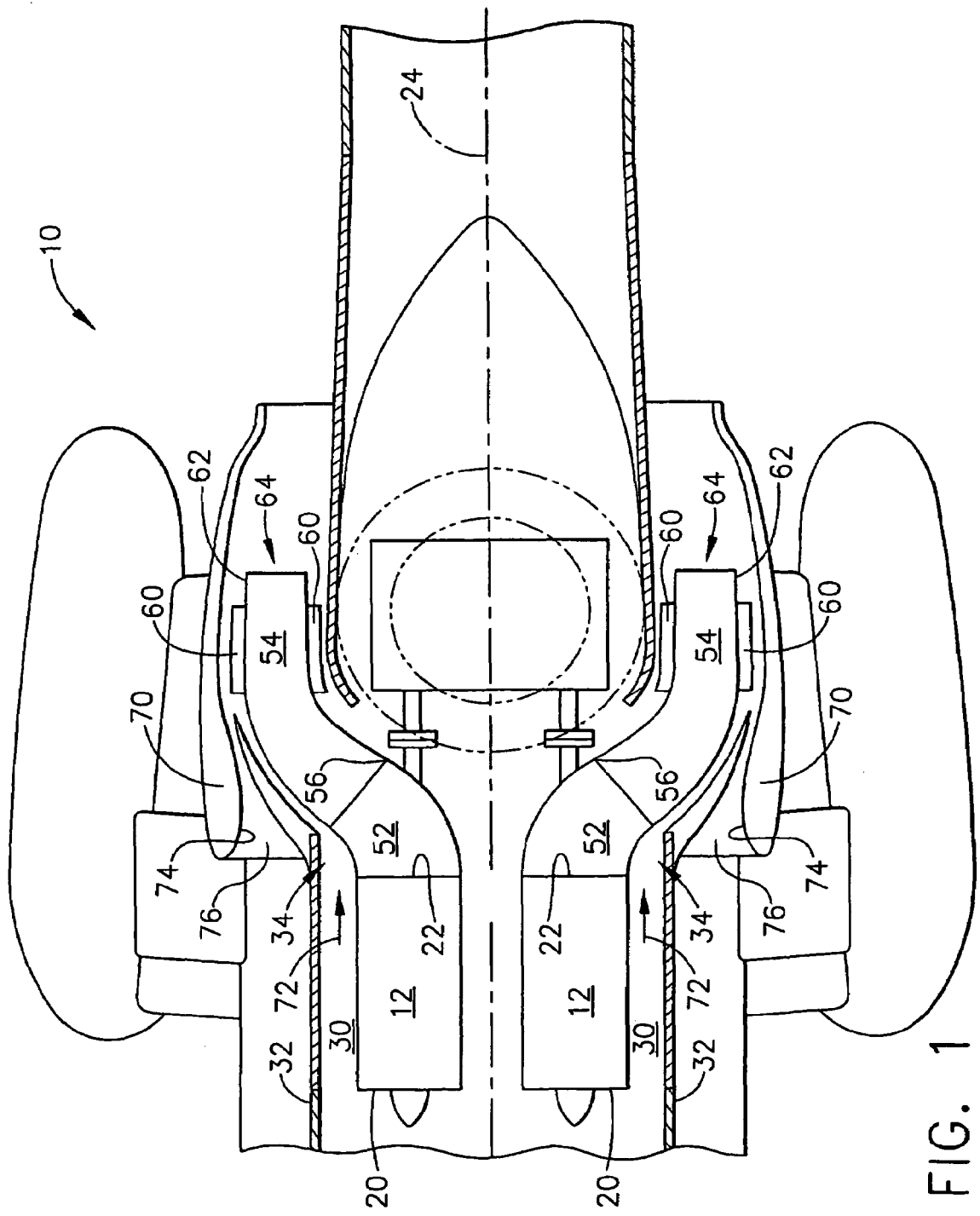
FIG. 1 is a plan view of a vehicle that includes a pair of gas turbine engines.

FIG. 1 is a plan view of an exemplary helicopter 10 that includes a pair of core gas turbine engines 12 that each include an inlet end 20 and an exhaust end 22. In the exemplary embodiment, gas turbine engines 12 are substantially symmetrical with respect to an axis of symmetry 24 extending between gas turbine engines 12. Gas turbine engines 12 are each mounted within an engine compartment 30 defined by a helicopter fuselage 32. Specifically, in the exemplary embodiment, each gas turbine engine 12 includes an exhaust assembly 34 that extends downstream from gas turbine engines 12 for discharging exhaust gases from gas turbine engines 12. In one embodiment, each gas turbine engine 12 is a T58, T64, T700 or CT7 gas turbine engine commercially available from General Electric Aircraft Engines, Lynn, Mass.

The infrared suppression systems described herein facilitate suppressing an exhaust infrared signature of each gas turbine engine 12 during engine operation, and/or post engine operation. As used herein, the term suppression means that the infrared signature emanating from each gas turbine engine 12 is facilitated to be reduced below a pre-determined threshold value that is indicative of the acquisition, tracking, and/or targeting capability of a particular infrared threat.

Each exhaust nozzle assembly 34 includes a turbine rear frame housing 52 and a primary nozzle 54 coupled in flow communication. Specifically, exhaust discharged from gas turbine engines 12 is channeled through rear frame housing 52 prior to entering primary nozzle 54. In the exemplary embodiment, each primary nozzle 54 is a single-wall nozzle that includes an elbow 56. Elbow 56 turns the direction of exhaust flowing through primary nozzle 54 towards a direction that is substantially parallel to centerline axis of symmetry 24. In the exemplary embodiment, each primary nozzle 54 includes a plurality of cooling fins 60 that extend substantially circumferentially around an external surface 62 of primary nozzle 54. Moreover, in the exemplary embodiment, each primary nozzle 54 has a cross-sectional profile 64 that may be, but is not limited to being, circular, elliptical, rectangular, or daisy-shaped.

Primary nozzles 54 are substantially surrounded by an insulated cowl 70 such that a cooling passage 72 is defined between cowl 70 and primary nozzle 54. Heat is transferred from nozzle 54, through cooling fins 60 and into cooling passage 72 thus reducing temperature of nozzle 54. Cooling fins 70 are a key feature for infrared suppression. Cowls 70 extends circumferentially around nozzles 54 and are spaced radially outward therefrom. More specifically, cowls 70 extends around primary nozzles 54 such that at least one cooling passage 72 is defined between an inner surface 74 of cowl 70 and nozzle external surface 62. In the exemplary embodiment, cooling fins 60 are coupled to external surface 62 and extend at least partially into cooling passage 72.

During operation, ambient air is supplied to gas turbine engines 12 through a plurality of cowl openings 76. More specifically, a portion of ambient air channeled through openings 76 is routed into cooling passage 72 to facilitate reducing an operating temperature of external surfaces 62 of each primary nozzle 54. Moreover, a portion of ambient air channeled through openings 76 is routed through cooling passages 72, cooling fins 60, and mixed with the exhaust gases discharged from primary nozzles 54 to facilitate reducing an exhaust gas temperature of gas turbines 12.

FIG. 2 is a cross-sectional view of portion of an exemplary infrared suppression system 100 in a first operational configuration that can be used with gas turbine engine 12 shown in FIG. 1. FIG. 3 is a cross-sectional view of infrared suppression system 100 in a second operational configuration. FIG. 4 is a cross-sectional view of infrared suppression system 100 in a third operational configuration.

In the exemplary embodiment, infrared suppression system 100 includes an attachment foot 102 and a blocking fin 104 that extends from attachment foot 102. Blocking fin 104 includes a first portion 110 that extends from attachment foot 102, and a second portion 112 that extends from first portion 110. In one embodiment, attachment foot 102 and blocking fin 104 are fabricated together unitarily. In another embodiment, first and second portions 110 and 112 are fabricated together to form a unitary blocking fin 104 that is coupled to attachment foot 102 through a brazing and/or welding procedure, for example. In an alternative embodiment, attachment foot 102 and/or blocking fin 104 are fabricated from a plurality of pieces. Blocking fin 104 has a substantially U-shaped cross-sectional profile that defines a gap 114 between first and second portions 110 and 112, respectively. In alternative embodiments, gap 114 is not defined between first and second portions 110 and 112, respectively.

In the exemplary embodiment, infrared suppression system 100 is coupled to external surface 62 axially aft of cooling fins 60. More specifically, infrared suppression system 100 circumscribes primary nozzle 54 such that cooling air channeled through cooling fins 60 is then channeled axially aft to facilitate cooling infrared suppression system 100. Accordingly, infrared suppression system 100 has a cross-sectional profile 116 that is substantially similar to primary nozzle cross-sectional profile 64.

In one embodiment, infrared suppression system 100 is coupled to an end of primary nozzle 54. More specifically, a first end 118 of attachment foot 102 is coupled to a first end 120 of primary nozzle 54 through a brazing and/or welding procedure, for example, as shown in FIG. 2. In an alternative embodiment, infrared suppression system 100 is coupled to nozzle external surface 62 as shown in FIG. 3. More specifically, in the exemplary embodiment, attachment foot 102 is coupled to nozzle external surface 62 through a brazing and/or welding procedure, for example. Accordingly, infrared suppression system 100 includes a gap 122 that is defined between an end 124 of second portion 112 and external surface 62. In another alternative embodiment, infrared suppression system 100 is formed unitarily with primary nozzle 54 as shown in FIG. 4. In the each embodiment, infrared suppression system 100 extends from primary nozzle 54 such that a line of sight 130 of cooling passage 72 is at least partially obstructed. More specifically, infrared suppression system 100 extends at least partially into cooling passage 72 such that an external observer's view of cooling passage, cooling fins 60, and/or external surface 62 is at least partially blocked, and as such, infrared emissions that may be emitted from these surfaces are facilitated to be reduced. Accordingly, the operative effectiveness of an infrared guided weapon either detecting, acquiring and and/or tracking the aircraft is also facilitated to be reduced.

During operation, exhaust gases emitted from gas turbine engine 12 are channeled through primary nozzle 54. As a result, a temperature of external surface 62 of primary nozzle 54 is increased. Moreover, since infrared suppression system 100 is coupled to external surface 62, a temperature of blocking fin 104 is also increased. Heat emitted from external surface 62 is transmitted to attachment foot 102 through heat conduction. Since blocking fin 104 is coupled to either attachment foot 102 and/or directly to primary nozzle 54, heat generated by external surface 62 is transmitted conductively to blocking fin 104. More specifically, because blocking fin 104 has a substantially U-shaped cross-sectional profile, heat is transmitted from attachment foot 102 initially through first portion 110 and then through second portion 112. Accordingly, blocking fin 104 provides a heat conduction path to facilitate dissipating heat generated from external surface 62. Moreover, because first portion 110 and second portion 112 are separated by gap 114, an operating temperature of second portion 112 generally remains less than an operating temperature of first portion 110, and since second portion 112 is coupled axially downstream from first portion 110, the relatively cooler second portion 112 is observable to external viewing.

Additionally, at least a portion of ambient air channeled through cooling passage 72 impinges on first portion 100, thus reducing a temperature of first portion 110. Reducing an operating temperature of first portion 110 facilitates reducing an operating temperature of second portion 112. Accordingly, coupling blocking fin 104 to external surface 62 facilitates lengthening the conduction path between external surface 62 and second portion 112, and facilitates reducing infrared emissions emitted from second portion 112. Further, utilizing ambient air to cool first portion 110 facilitates reducing an operating temperature of second portion 112 and also facilitates reducing infrared emissions emitted from second portion 112. As a result, during operation, and for a period of time post operation, infrared suppression system 100 includes a relatively warmer side (first portion 110) and a relatively cooler side (second portion 112) that is axially downstream from first portion 110. As such, the relatively cooler side (second portion 112) emits a reduced infrared signature and is positioned within line of sight 130 such that the overall effectiveness an infrared guided weapon to either detect, acquire and and/or track the aircraft is facilitated to be reduced.

Figure 6:
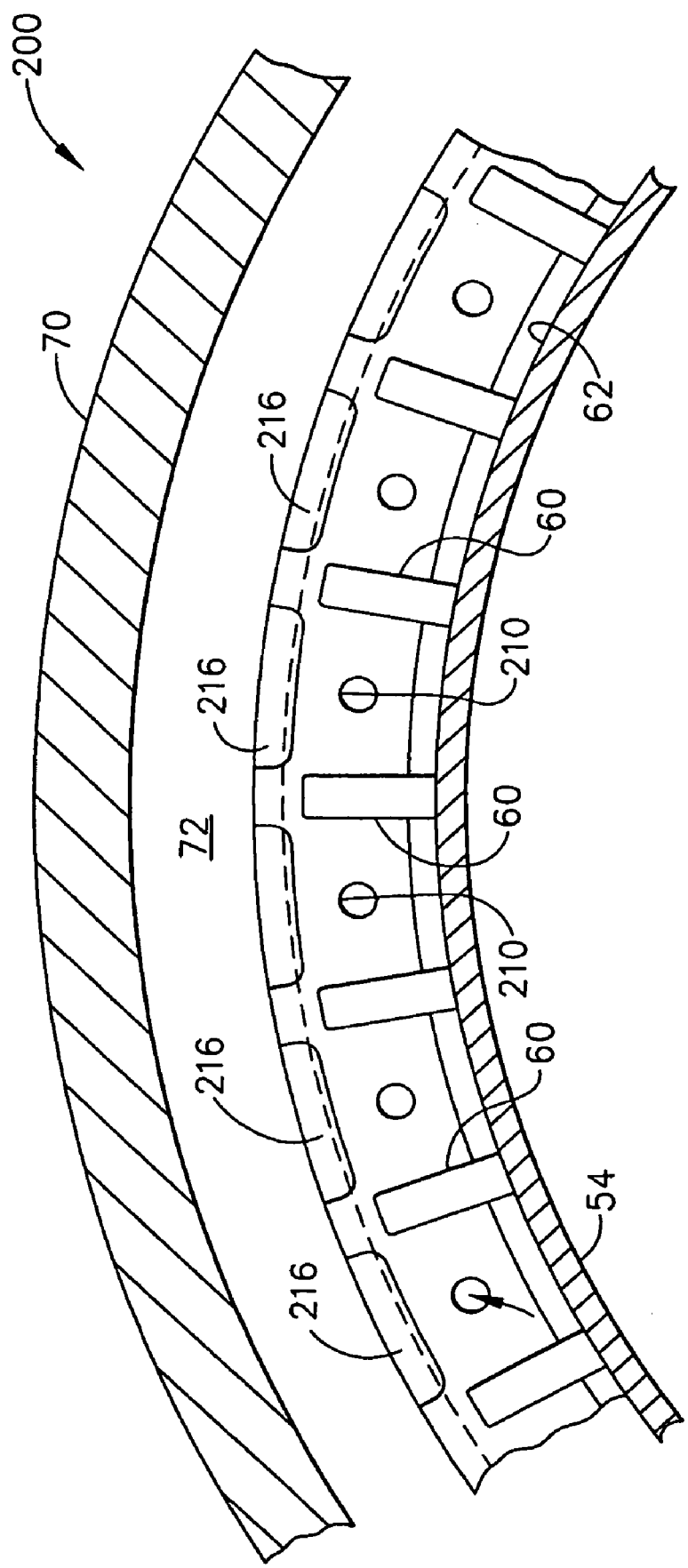
FIG. 6 is a perspective view of the infrared suppression system shown in FIG. 5.

FIG. 5 is a cross-sectional view of portion of an exemplary infrared suppression system 200 that may be used with gas turbine engine 12. FIG. 6 is a axial view of infrared suppression system 200. In the exemplary embodiment, infrared suppression system 200 is substantially similar to infrared suppression system 100 (shown in FIGS. 2, 3, and 4), and components of infrared suppression system 200 that are identical to components of infrared suppression system 200 are identified in FIGS. 5 and 6 using the same reference numerals used in FIGS. 2, 3, and 4.

In the exemplary embodiment, infrared suppression system 200 includes attachment foot 102 and blocking fin 104 that extends from attachment foot 102. Blocking fin 104 includes first portion 110 that extends from attachment foot 102, and second portion 112 that extends from first portion 110. In the exemplary embodiment, blocking fin 104 has a substantially U-shaped cross-sectional profile and that defines a gap 114 between first and second portions 110 and 112, respectively. In an alternative embodiment, gap 114 is not defined between first and second portions 110 and 112.

In the exemplary embodiment, infrared suppression system 200 is coupled to external surface 62 axially aft of cooling fins 60. More specifically, infrared suppression system 200 extends substantially circumferentially around primary nozzle 54 such that cooling air channeled through cooling fins 60 is then channeled aftward to facilitate cooling infrared suppression system 200. Accordingly, infrared suppression system 200 has a cross-sectional profile 116 that is substantially similar to primary nozzle cross-sectional profile 64. Although infrared suppression system 200 is shown coupled to external surface 62 it should be realized that infrared suppression system may also be coupled to end 120 as shown in FIG. 2, or alternatively formed unitarily with primary nozzle 54 as shown in FIG. 4.

In the exemplary embodiments, infrared suppression system 200 is coupled to primary nozzle 54 such that line of sight 130 of cooling passage 72 is at least partially obstructed. More specifically, infrared suppression system 200 extends at least partially into cooling passage 72 such that an external observer's view of cooling passage 72, cooling fins 60, and/or external surface 62 is at least partially blocked, and as such, infrared emissions that may be emitted from these surfaces are facilitated to be reduced. Accordingly, the overall effectiveness of an infrared guided weapon either detecting, acquiring and and/or tracking the aircraft is also facilitated to be reduced.

In the exemplary embodiment, infrared suppression system 200 also includes at least a plurality of openings 210 that extend through first portion 110 and are positioned approximately midway between a first end 212 of first portion 110 and a second end 214 of first portion 110. In alternative embodiment, infrared suppression system includes a plurality of openings 216 that extend through first portion 110 and are positioned near second end 214. In another alternative embodiment, infrared suppression system includes plurality of openings 210 and 216 that extend through first portion 110. Plurality of openings 210 and 216 may have at least one of a substantially circular shape, oval shape, or rectangular shape to facilitate channeling a predetermined quantity of ambient air from cooling passage 72 into gap 114.

During operation, exhaust gases emitted from gas turbine engine 12 are channeled through primary nozzle 54. As a result, a temperature of external surface 62 of primary nozzle 54 is increased. Moreover, since infrared suppression system 200 is coupled to external surface 62 a temperature of blocking fin 104 is also increased. Heat emitted from external surface 62 is transmitted to attachment foot 102 through heat conduction. Since blocking fin 104 is coupled to either attachment foot 102 and/or directly to primary nozzle 54, heat generated by external surface 62 is transmitted conductively to blocking fin 104. More specifically, because blocking fin 104 has a substantially U-shaped cross-sectional profile, heat is transmitted from attachment foot 102, initially through first portion 110, and then through second portion 112. Accordingly, blocking fin 104 provides a heat conduction path to facilitate dissipating heat generated from external surface 62.

Additionally, blocking fin 104 includes plurality of openings 210 and/or 212 that facilitate reducing thermal communication, i.e. a conduction area, between first portion 110 (warm side) and second portion 112 (cool side). Moreover, because first portion 110 and second portion 112 are separated by gap 114, an operating temperature of second portion 112 generally remains less than an operating temperature of first portion 110. Since second portion 112 is coupled axially downstream from first portion 110, the relatively cooler second portion 112 is observable to external viewing.

During operation, at least a portion of ambient air channeled through cooling passage 72 impinges on first portion 110 thus reducing an operating temperature of first portion 110. A second portion of the ambient air is channeled through at least one of plurality of openings 210 and/or 216 and into gap 114 to facilitate further reducing a temperature of second portion 112. Reducing a temperature of first portion 110 facilitates reducing a temperature of second portion 112. Accordingly, coupling blocking fin 104 to external surface 62 facilitates lengthening the conduction path between external surface 62 and second portion 112 and facilitates reducing infrared emissions emitted from second portion 112. Further, utilizing ambient air to cool first portion and second portions 110 and 112, respectively, facilitates reducing an operating temperature of second portion 112 using both convection and conduction cooling thereby reducing the infrared emissions emitted from second portion 112. As a result, during operation and for a period of time post operation, infrared suppression system 200 includes a relatively warmer side 110 and a relatively cooler side (second portion 112) that is axially downstream from first portion 110. As such, the relatively cooler side (second portion 112) emits a reduced infrared signature and is positioned within line of sight 130 such that the overall effectiveness of an infrared guided weapon to either detect, acquire and and/or track the aircraft is facilitated to be reduced.

FIG. 7 is a cross-sectional view of a portion of an exemplary infrared suppression system 300 that may be used with gas turbine engine 12. In the exemplary embodiment, infrared suppression system 300 is substantially similar to infrared suppression system 100 (shown in FIGS. 2, 3, and 4), and components of infrared suppression system 300 that are identical to components of infrared suppression system 300 are identified in FIG. 7 using the same reference numerals used in FIGS. 2, 3, and 4.

In the exemplary embodiment, infrared suppression system 300 includes an attachment foot 302 and a blocking fin 304 that extends from attachment foot 302. Attachment foot 302 includes a first portion 306 and a second portion 308 that extends from first portion 306. In one embodiment, first portion 306 and second portion 308 are fabricated together unitarily. In another embodiment, first portion 306 is coupled to second portion 308 through a brazing and/or welding procedure, for example. In alternative embodiments, attachment foot 302 and/or blocking fin 304 are fabricated from a plurality of pieces. Attachment foot 302 has a substantially L-shaped cross-sectional profile.

Blocking fin 304 includes a first portion 310 that extends from attachment foot 302, and a second portion 312 that extends from first portion 310. In one embodiment, first and second portions 310 and 312 are fabricated together unitarily and coupled to attachment foot 302 through a brazing and/or welding procedure, for example. In the exemplary embodiment, blocking fin 304 has a substantially J-shaped cross-sectional profile that defines a gap 314 between first and second portions 310 and 312. In the exemplary embodiment, attachment foot 302 extends from blocking fin 304 such that attachment foot second portion 308 extends at least partially into gap 314. More specifically, attachment foot 302 extends from blocking fin 304 such that blocking fin 304 at least partially circumscribes second portion 308.

In the exemplary embodiment, infrared suppression system 300 is coupled to external surface 62 axially aft of cooling fins 60. More specifically, infrared suppression system 300 extends substantially circumferentially around primary nozzle 54 such that cooling air channeled through cooling fins 60 is then channeled aftward facilitate cooling infrared suppression system 300. Accordingly, infrared suppression system 300 has a cross-sectional profile 316 that is substantially similar to primary nozzle cross-sectional profile 64. Although infrared suppression system 300 is shown coupled to external surface 62 it should be realized that infrared suppression system may also be coupled to end 120 as shown in FIG. 2, or alternatively formed unitarily with primary nozzle 54 as shown in FIG. 4.

In the exemplary embodiments, infrared suppression system 300 is coupled to primary nozzle 54 such that line of sight 130 of cooling passage 72 is at least partially obstructed. More specifically, infrared suppression system 300 extends at least partially into cooling passage 72 such that an external observer's view of cooling passage, cooling fins 60, and/or external surface 62 is at least partially blocked, and as such, infrared emissions that may be emitted from these surfaces are facilitated to be reduced. Accordingly, the operative effectiveness of an infrared guided weapon either detecting, acquiring and and/or tracking the aircraft is also facilitated to be reduced.

During operation, exhaust gases emitted from gas turbine engine 12 are channeled through primary nozzle 54. As a result, a temperature of external surface 62 of primary nozzle 54 is increased. Moreover, since infrared suppression system 300 is coupled to external surface 62 a temperature of blocking fin 304 is also increased. Heat emitted from external surface 62 is transmitted to attachment foot 302 through heat conduction. Since blocking fin 304 is coupled to either attachment foot 302 and/or directly to primary nozzle 54, the heat generated by external surface 62 is transmitted conductively to blocking fin 304. More specifically, because infrared suppression system 300 has a substantially U-shaped cross-sectional profile, heat is transmitted, from attachment foot 302, initially through first portion 310 and then through second portion 312. Accordingly, blocking fin 304 provides a heat conduction path to facilitate dissipating heat generated from external surface 62. Moreover, because first portion 310 and second portion 312 are separated by gap 314, an operating temperature of second portion 312 generally remains less than an operating temperature of first portion 310, and since second portion 312 is coupled axially downstream from first portion 310, the relatively cooler second portion 312 is observable to external viewing.

Additionally, at least a portion of ambient air channeled through cooling passage 72 impinges on first portion 310, thus reducing a temperature of first portion 310. Reducing an operating temperature of first portion 310 facilitates reducing an operating temperature of second portion 312. Accordingly, coupling blocking fin 304 to external surface 62 facilitates lengthening the conduction path between external surface 62 and second portion 312, and facilitates reducing the infrared emissions emitted from second portion 312. Further, utilizing ambient air to cool first portion 310 facilitates reducing an operating temperature of second portion 312 and also facilitates reducing infrared emissions emitted from second portion 312. As a result, during operation, and for a period of time post operation, infrared suppression system 300 includes a relatively warmer side (first portion 310) and a relatively cooler side (second portion 312) that is axially downstream from relatively warmer side (first portion 310). As such, the relatively cooler side emits a reduced infrared signature and is positioned within line of sight 130 such that the overall effectiveness of an infrared guided weapon either detecting, acquiring and and/or tracking the aircraft is facilitated to be reduced.

FIG. 8 is a cross-sectional view of an exemplary infrared suppression system 400 that may be used with gas turbine engine 12. In the exemplary embodiment, infrared suppression system 400 is substantially similar to infrared suppression system 100 (shown in FIGS. 2, 3, and 4), and components of infrared suppression system 400 that are identical to components of infrared suppression system 400 are identified in FIG. 7 using the same reference numerals used in FIGS. 2, 3, and 4.

In the exemplary embodiment, infrared suppression system 400 includes an attachment foot 402 and a blocking fin 404 that extends from attachment foot 402. In the exemplary embodiment, attachment foot 402 is substantially U-shaped and blocking fin 404 is substantially J-shaped. In one embodiment, attachment foot 402 and blocking fin 404 are fabricated together unitarily. In another embodiment, attachment foot 402 is coupled to blocking fin 404 through a brazing and/or welding procedure, for example.

In the exemplary embodiment, infrared suppression system 400 is coupled to external surface 62 axially aft of cooling fins 60. More specifically, infrared suppression system 400 extends substantially circumferentially around primary nozzle 54 such that cooling air channeled through cooling fins 60 is then channeled aftward to facilitate cooling infrared suppression system 400. Accordingly, infrared suppression system 400 has a cross-sectional profile 416 that is substantially similar to primary nozzle cross-sectional profile 64. Although infrared suppression system 400 is shown coupled to nozzle external surface 62 it should be realized that infrared suppression system may also be coupled to end 120 as shown in FIG. 2, or alternatively formed unitarily with primary nozzle 54 as shown in FIG. 4.

In the exemplary embodiments, infrared suppression system 400 is coupled to primary nozzle 54 such that line of sight 130 of cooling passage 72 is at least partially obstructed. More specifically, infrared suppression system 400 extends at least partially into cooling passage 72 such that an external observer's view of cooling passage, cooling fins 60, and/or external surface 62 is at least partially blocked by infrared suppression system 400 such that infrared emissions that may be emitted from these surfaces is facilitated to be reduced. Accordingly the overall effectiveness of an infrared guided weapon either detecting, acquiring and and/or tracking the aircraft is facilitated to be reduced.

During operation, exhaust gases emitted from gas turbine engine 12 are channeled through primary nozzle 54. As a result, a temperature of external surface 62 of primary nozzle 54 is increased. Moreover, since infrared suppression system 400 is coupled to external surface 62 a temperature of blocking fin 404 also increases. Heat emitted from external surface 62 is transmitted to attachment foot 402 through heat conduction. Since blocking fin 404 is coupled to either attachment foot 402 and/or directly to primary nozzle 54, the heat generated by external surface 62 is transmitted conductively to blocking fin 404. More specifically, since infrared suppression system 400 has a substantially U-shaped cross-sectional profile, heat is transmitted from attachment foot 402 through blocking fin 404. Accordingly, blocking fin 404 provides a heat conduction path to facilitate dissipating heat generated from external surface 62. Moreover, because attachment foot 402 and blocking fin 404 are separated by gap 414, an operating temperature of attachment foot 402 generally remains less than an operating temperature of blocking fin 404, and since blocking fin 404 is coupled axially downstream from attachment foot, the relatively cooler blocking fin is observable to external viewing.

Additionally, at least a portion of ambient air channeled through cooling passage 72 impinges on attachment foot 402 thus reducing a temperature of attachment foot 402. Reducing an operating temperature of attachment foot 402 facilitates reducing an operating temperature of blocking fin 404. Accordingly, utilizing ambient air to facilitate attachment foot 402 reduces an operating temperature of blocking fin 404. As a result, infrared suppression system 400 includes a relatively warm side (attachment foot 404) and a relatively cool side (blocking fin 404) that is axially downstream from the relatively warm side. As such, relatively cool side (blocking fin 404) has a reduced infrared signature and is positioned within line of sight 130 to facilitate reducing the effectiveness of an infrared guided weapon either detecting, acquiring and and/or tracking the aircraft.

The exemplary infrared suppression systems described herein each utilize an extended blocking fin that has a substantially U-shaped configuration to reduce infrared emissions. Specifically, the blocking fin configuration facilitates reducing thermal connectivity to hot attachment locations, i.e., the exhaust nozzle. The blocking fin also includes a plurality of cooling holes positioned near the base of the U-shaped blocking fin to facilitate reducing thermal connectivity to the exhaust nozzle. Moreover the cooling holes permit air to be channeled into the U-shaped blocking fin to facilitate cooling the axially aft portion of the blocking fin and to thereby facilitate reducing the infrared signature emitted from the gas turbine engine. The cooling holes are optimally spaced to facilitate maximizing thermal isolation, improving cooling air flow through the blocking fin, and maintaining a mechanical integrity of the blocking fin.

The above-described infrared suppression systems are cost-effective and highly reliable. Each system includes a substantially U-shaped portion that facilitates suppressing an infrared signature generated by the gas turbine engines. Additional cooling air facilitates cooling flowpath surfaces that are visible through the exhaust assembly discharge. As a result, the infrared suppression system facilitates suppressing an infrared signature of the engine in a cost-effective and reliable manner.

Exemplary embodiments of infrared suppression systems are described above in detail. The systems are not limited to the specific embodiments described herein, but rather, components of each system may be utilized independently and separately from other components described herein. Each infrared suppression system can also be used in combination with other gas turbine engines.

While the invention has been described in terms of various specific embodiments, those skilled in the art will recognize that the invention can be practiced with modification within the spirit and scope of the claims.

What is claimed is:

1. A method for assembling a gas turbine engine, said method comprising:
    mounting a core engine to a vehicle;
    coupling a fuselage radially outward and around the core engine;
    coupling an exhaust nozzle to the core engine to channel exhaust gases discharged from the core engine, wherein the exhaust nozzle includes a cowl and a primary nozzle coupled radially inward from the cowl; and
    coupling an infrared suppression system in flow communication with the engine exhaust nozzle to facilitate suppressing an exhaust infrared signature of the core engine, wherein the infrared suppression system includes a blocking fin that has an upstream end face oriented substantially perpendicular to an axis of a rotor of the core engine, said blocking fin having a substantially U-shaped cross-sectional profile and such that a cooling air flowpath is defined between the cowl and the blocking fin.

2. A method in accordance with claim 1 wherein coupling an infrared suppression system in flow communication with the engine exhaust nozzle comprises:
    coupling an attachment foot to the engine exhaust nozzle; and
    coupling the blocking fin having a substantially U-shaped cross-sectional profile to the attachment foot.

3. A method in accordance with claim 2 wherein coupling a blocking fin to the attachment foot comprises:
    coupling a first portion of the blocking fin to the attachment foot; and
    coupling a second portion the blocking fin to the first portion such that a gap is defined between the first and second portions.

4. A method in accordance with claim 3 further comprising forming a plurality of openings through the upstream first portion blocking fin to enable ambient air to be channeled from the cooling air flowpath into the gap and impinge on second portion to facilitate reducing an operating temperature of the second portion.

5. A method in accordance with claim 1 further comprising a coupling a plurality of cooling fins to the engine exhaust nozzle such that the plurality of cooling fins are axially forward of the blocking fin and substantially hidden from external views by said blocking fin.

6. An exhaust assembly for a gas turbine engine, said exhaust assembly comprising:
   an engine exhaust nozzle coupled to said gas turbine engine;
   an exhaust cowl at least partially circumscribing said engine exhaust nozzle such that a cooling passage is defined between said engine exhaust nozzle and said exhaust cowl; and
   an infrared suppression system coupled to said engine exhaust nozzle, a portion of said infrared suppression system comprising a plurality of blocking fins that have an upstream end face oriented substantially perpendicular to an axis of a rotor of said gas turbine engine with a substantially U-shaped cross-sectional profile that extends at least partially into said cooling passage, said suppression system facilitates suppressing an exhaust infrared signature of the gas turbine engine.

7. An exhaust assembly in accordance with claim 6 wherein said infrared suppression system comprises:
   an attachment foot coupled to said engine exhaust nozzle; and
   a blocking fin extending from said attachment foot, said blocking fin having a substantially U-shaped cross-sectional profile.

8. An exhaust assembly in accordance with claim 6 wherein said blocking fin comprises:
   an upstream first portion; and
   a second portion extending from said first portion such that a gap is defined between said first and second portions.

9. An exhaust assembly in accordance with claim 8 wherein said upstream first portion comprises a plurality of openings extending therethrough to facilitate channeling ambient cooling air from said cooling passage into said gap and impinging on said second portion.

10. An exhaust assembly in accordance with claim 7 wherein said attachment foot is formed unitarily with said blocking fin.

11. An exhaust assembly in accordance with claim 6 wherein said infrared suppression system is formed unitarily with said engine exhaust nozzle.

12. An exhaust assembly in accordance with claim 6 wherein said infrared suppression system comprises:
   an attachment foot coupled to said engine exhaust nozzle, said attachment foot having a substantially L-shaped cross-sectional profile; and
   a blocking fin extending from said attachment foot, said blocking fin having a substantially J-shaped cross-sectional profile.

13. An exhaust assembly in accordance with claim 6 wherein said infrared suppression system comprises:
   an attachment foot coupled to said engine exhaust nozzle, said attachment foot having a substantially U-shaped cross-sectional profile; and
   a blocking fin extending from said attachment foot, said blocking fin having a substantially L-shaped cross-sectional profile.

14. An exhaust assembly in accordance with claim 6 further comprising a plurality of cooling fins coupled to said engine exhaust nozzle and axially forward of said infrared suppression system.

15. A gas turbine engine configured to couple to a fuselage, said gas turbine engine comprising:
   an engine exhaust nozzle coupled to said gas turbine engine;
   an exhaust cowl at least partially circumscribing said engine exhaust nozzle such that a cooling passage is defined between said engine exhaust nozzle and said exhaust cowl;
   an infrared suppression system coupled to said engine exhaust nozzle, a portion of said infrared suppression system comprising a blocking fin substantially U-shaped cross-sectional profile that extends at least partially into said cooling passage, said suppression system facilitates suppressing an exhaust infrared signature of the gas turbine engine; and
   a plurality of cooling fins coupled to said engine exhaust nozzle axially forward of said infrared suppression system.

16. A gas turbine engine in accordance with claim 15 wherein said infrared suppression system comprises:
   an attachment foot coupled to said engine exhaust nozzle; and
   a blocking fin extending from said attachment foot, said blocking fin having a substantially U-shaped cross-sectional profile.

17. A gas turbine engine in accordance with claim 15 wherein said attachment foot is formed unitarily with said blocking fin.

18. A gas turbine engine in accordance with claim 15 wherein said infrared suppression system is formed unitarily with said engine exhaust nozzle.

19. A gas turbine engine in accordance with claim 15 wherein said blocking fin comprises:
   an upstream first portion; and
   a second portion extending from said first portion such that a gap is defined between said first and second portions.

20. A gas turbine engine in accordance with claim 19 blocking fin wherein said upstream first portion comprises a plurality of openings extending therethrough to facilitate channeling ambient air from said cooling passage into said gap to cool said second portion.

21. A gas turbine engine in accordance with claim 19 blocking fin wherin upstream first portion comprises a plurality of openings extending therethrough to facilitate channeling ambient air from said cooling passage to impinge on and cool said second portion.

* * * * *